United States Patent
Leone et al.

(10) Patent No.: US 8,002,498 B2
(45) Date of Patent: *Aug. 23, 2011

(54) SYSTEMS AND METHODS FOR UNDERGROUND STORAGE OF BIOGAS

(75) Inventors: Gerald A. Leone, Victor, NY (US); Larry G. Shilling, Alfred Station, NY (US)

(73) Assignee: Casella Waste Systems, Inc., Rutland, VT (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/786,039

(22) Filed: May 24, 2010

(65) Prior Publication Data

US 2010/0232880 A1    Sep. 16, 2010

Related U.S. Application Data

(63) Continuation of application No. 11/415,075, filed on May 2, 2006, now Pat. No. 7,722,289, which is a continuation-in-part of application No. 11/006,580, filed on Dec. 8, 2004, now abandoned.

(51) Int. Cl.
    *E21B 43/00*    (2006.01)
(52) U.S. Cl. ......................................... 405/53; 166/265
(58) Field of Classification Search .................... 405/53; 166/265, 245

See application file for complete search history.

(56) References Cited

U.S. PATENT DOCUMENTS

| | | | |
|---|---|---|---|
| 3,130,026 A | | 4/1964 | Becker |
| 3,175,614 A | * | 3/1965 | Wyllie ..................... 166/250.12 |
| 3,250,326 A | * | 5/1966 | Witherspoon .......... 166/250.03 |
| 3,453,835 A | | 7/1969 | Hochgesand |
| 3,538,340 A | | 11/1970 | Lang |
| 3,975,172 A | | 8/1976 | Ranke et al. |
| 4,026,355 A | | 5/1977 | Johnson et al. |
| 4,252,548 A | | 2/1981 | Markbreiter et al. |
| 4,353,214 A | | 10/1982 | Gardner |
| 4,442,901 A | | 4/1984 | Zison |
| 4,469,176 A | | 9/1984 | Zison et al. |
| 4,518,399 A | | 5/1985 | Croskell et al. |
| 4,670,148 A | | 6/1987 | Schneider et al. |
| 4,838,733 A | | 6/1989 | Katz |
| 5,206,067 A | | 4/1993 | Bonzo |
| 5,566,756 A | | 10/1996 | Chaback et al. |
| 5,642,630 A | * | 7/1997 | Abdelmalek et al. ........... 62/632 |
| 6,029,370 A | | 2/2000 | Cromeens |
| 6,244,338 B1 | | 6/2001 | Mones |
| 7,722,289 B2 | * | 5/2010 | Leone et al. .................... 405/53 |
| 2003/0063952 A1 | | 4/2003 | Cavender |

FOREIGN PATENT DOCUMENTS

DE    3735208 A1    4/1989

OTHER PUBLICATIONS

Murakami, M. "Managing Water for Peace in the Middle East: Alternative Strategies" 1995, United Nations University, selected pages.*
Murkami, M. "Managing water for peace in the middle east: alternative strategies," 1995, United Nations University.

* cited by examiner

*Primary Examiner* — John Kreck
(74) *Attorney, Agent, or Firm* — Wilmer Cutler Pickering Hale and Dorr LLP

(57) ABSTRACT

Systems and methods for producing purified biogas are disclosed. In one embodiment of the invention, a method includes collecting biogas from a landfill, transporting the biogas to a first well, injecting the biogas into the first well, and pressurizing the first well to store the biogas.

18 Claims, 3 Drawing Sheets

US 8,002,498 B2

SYSTEMS AND METHODS FOR UNDERGROUND STORAGE OF BIOGAS

CROSS REFERENCE TO RELATED APPLICATIONS

This application is a continuation of and claims benefits of U.S. application Ser. No. 11/415,075, filed May 2, 2006, which is a continuation-in-part of and claims the benefits of U.S. application Ser. No. 11/006,580, filed Dec. 8, 2004, which is hereby incorporated by reference in its entirety.

BACKGROUND OF THE INVENTION

1. Field of the Invention

Embodiments of the present invention relate to the use and storage of biogas and, more particularly, to underground storage of biogas.

2. Background Description

Biogas, which is generated when bacteria degrade biological material in the absence of oxygen in a process known as anaerobic digestion, is composed primarily of methane and carbon dioxide and, typically, trace constituents of hydrogen sulfide, mercaptans, vinyl chloride and/or other volatile organic compounds. Biogas represents both an environmental liability and a unique renewable energy resource.

Exemplary sources of biological material that can generate biogas are found at (or in) marshes, landfills (waste disposal facilities), septic tanks, farms (e.g., cattle and/or dairy farms), sewage treatment facilities, paper mills, olive oil mills, industrial food production facilities (e.g., potato processing, canning operations, and slaughter houses). Bioreactors can generate biogas at these locations or facilities. When the source of the biogas is a landfill, the biogas may be referred to as landfill gas.

Concerns that are often associated with biogas relate to odors, air quality impacts and explosion hazards. If released to the atmosphere untreated, biogas is also a potent greenhouse gas contributing to global climate change.

The methane component of biogas contains energy that could be used, for example, to generate electricity, heat buildings, fuel industrial processes, and/or run vehicles. Utilization of energy from biogas not only mitigates the local environmental impact of biogas, but also advantageously reduces consumption of fossil fuels that would otherwise be required to generate an equal amount of energy. Collection and use of biogas represents a significant opportunity to reduce greenhouse gas emissions to the atmosphere.

Due to the presence of carbon dioxide, nonmethane organics, and other contaminants, biogas generally cannot be stored in tanks for future use in an economically viable manner. We have discovered that biogas can be stored underground, generally at a lower cost. Embodiments of the present invention are directed to these, as well as other, important ends.

SUMMARY OF EMBODIMENTS OF THE INVENTION

Embodiments of the present invention are directed to systems and methods for storing biogas underground. Biogas is injected into wells using, for example, blowers or compressors to pressurize the biogas to a sufficient pressure for storage of the biogas in the well, and within formations beyond the well.

Embodiments of the present invention are directed to storing biogas having a composition of about 25% to about 95% methane. However, biogas that includes about 30% to about 90% methane and less than about 75% carbon dioxide, less than about 65% carbon dioxide, or less than about 50% carbon dioxide can also be stored. In another embodiment, biogas may include about 40% to about 90% methane; about 10% to about 60% carbon dioxide; 0% to about 10% nitrogen; 0 to 3% hydrogen; and 0 to 2% oxygen.

In one embodiment of the present invention, a system for storing biogas includes a well, a transport system for transporting biogas from a waste disposal facility to the well, a compressor for pressurizing the biogas in the well, an injection apparatus coupled with the well for injecting biogas into the well, and a collection apparatus coupled with the well for withdrawing biogas from the well. The biogas will generally include more than 40% methane and less than 75% carbon dioxide. The waste disposal facility can be a landfill, and the biogas can be landfill gas. The system may also include an underground formation that communicates with the well and stores biogas.

In another embodiment of the invention, a system for storing biogas includes a first well, a transport system for transporting biogas from a waste disposal facility to the first well, an injection apparatus coupled with the first well for injecting biogas into the first well, a second well, an underground formation communicating with the first well and the second well and storing biogas, a collection apparatus coupled with the second well for withdrawing biogas from the second well, and a compressor for pressurizing the biogas in the first well, the second well, and the underground formation. The biogas will generally include more than 40% methane and less than 75% carbon dioxide. The waste disposal facility can be a landfill, and the biogas can be landfill gas.

In another embodiment of the present invention, a method for storing biogas includes collecting biogas from a landfill, transporting the biogas to a first well, injecting the biogas into the first well, and pressurizing the first well to store the biogas. The method can also include moving the biogas from a lower portion of the first well into an underground formation communicating with the first well and storing biogas. In addition, the method can include withdrawing the biogas from a second well, and cleaning the biogas, subsequent to withdrawing the biogas from a second well, to remove impurities.

These and other aspects of the invention are described in more detail herein.

BRIEF DESCRIPTION OF THE DRAWINGS

The Detailed Description of the Invention, including the description of various embodiments of the invention, will be best understood when read in reference to the accompanying figures wherein.

DETAILED DESCRIPTION OF THE INVENTION

Figure 1:
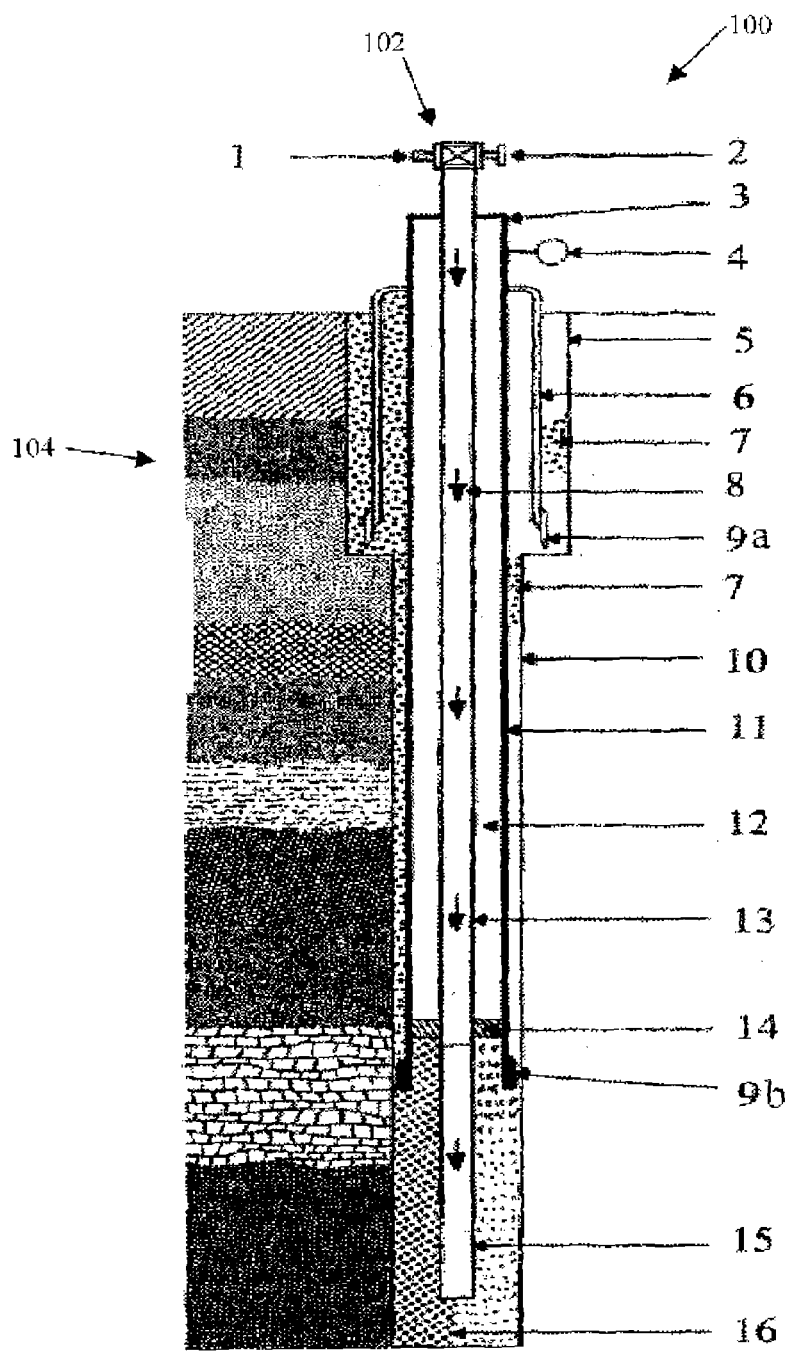
FIG. 1 shows an exemplary embodiment of a deep-well.

FIG. 1, generally at 100, is a cross-sectional view of a deep well 100 (hereinafter well 100) of an embodiment of the present invention. Well 100 may include or utilize input 1 to inject biogas into the well 100, and output 2 to remove biogas from the well 100. Well 100 also includes tubing head 3, pressure meter 4, surface hole 5, surface pipe casing 6, concrete 7, injection string 8, shoes 9a, 9b, bore hole 10, well casing long string 11, annulus 12, tubing 13, bottom hole packer 14, injection screen 15, and gravel pack 16.

Well 100 may extend from the surface of the earth to below the base of the deepest potable water aquifer, and may be cased along its full length. Well 100 may be about 500 feet deep or more; about 1,000 feet deep or more; about 1,500 feet deep or more; about 2,000 feet deep or more; about 2,500 feet deep or more; or about 3,000 feet deep or more. Well 100 may be on land or under water. An under water well 100 may be, for example, under a lake bed or under the ocean floor.

Well 100 may be drilled for the purpose of storing biogas, or may be a natural gas well, public supply well, oil well, coal-bed well, or the like. Biogas will generally have a composition of about 25% to about 95% methane. However, biogas that includes about 30% to about 90% methane and less than about 75% carbon dioxide, less than about 65% carbon dioxide, or less than about 50% carbon dioxide can also be stored. In another embodiment, biogas may include about 40% to about 90% methane; about 10% to about 60% carbon dioxide; 0% to about 10% nitrogen; 0 to 3% hydrogen; and 0 to 2% oxygen.

Well 100 may be constructed with one or more casings, which strengthen the sides of the well hole, ensure that no gas seeps out of the well hole, and keep other fluids or gases from seeping into specific formations through well 100. Well casing, such as surface pipe casing 6 and well casing long string 11, typically include a series of metal or plastic tubes installed in a drilled hole.

Types of casing used depend on the subsurface characteristics of well 100, including the diameter of well 100 and the pressures and temperatures experienced throughout well 100. In most wells, the diameter of the well hole decreases the deeper it is drilled, leading to a type of conical shape that is taken into account when installing casing. The interior of the casing may include a complete or partial polymer coating, such as a high density polyethylene coating. A polymer coating within the casing would prevent any reactions between the biogas and the coating. For example, at least a partial polymer coating would prevent hydrogen sulfide in the biogas from reacting with a metal casing.

There are generally five different types of well casing that may be used in connection with embodiments of the present invention, either individually or in combination. The casings include conductor casing, surface casing, intermediate casing, liner string, and production casing.

Conductor casing, which may be from about 20 to about 50 feet long, may be installed to prevent the top of well 100 from caving in and to help in the process of circulating the drilling fluid up from the bottom of well 100. The casing may be about 16 to about 20 inches in diameter, and be cemented into place before drilling begins.

Surface casing (e.g., surface pipe casing 6) is the next type of casing that may be installed. It can be anywhere from about a few hundred to about 2,000 feet long, and is usually smaller in diameter than the conductor casing. When installed, the surface casing fits inside the top of the conductor casing. The primary purpose of surface casing is to protect fresh water deposits near the surface of well 100 from being contaminated. It also serves as a conduit for drilling mud returning to the surface, and helps protect the drill hole from being damaged during drilling. Surface casing, like conductor casing, may also be cemented into place.

Intermediate casing (not shown) is usually the longest section of casing found in a well. The primary purpose of intermediate casing is to minimize hazards associated with sub-surface formations 104 that may affect well 100. FIG. 1 shows 10 different formations, each as depicted by the cross-sectional hatching running the depth of well 100. Known formations include, for example, the Tully, Onondaga, Oriskany, Salt Zone, Medina, and Lockport formations, each of which are largely sandstone, and shales. Other suitable formations may also be used in connection with one or more embodiments of the present invention. In FIG. 1, is biogas stored in well 100. Biogas can also be stored in one or more of formations 104. In many instances, even though there may be no evidence of an unusual underground formation, intermediate casing is run as a precaution against the possibility of such a formation affecting well 100. These intermediate casing areas may also be cemented into place in a standard manner for added protection.

Liner strings (not shown) are sometimes used in lieu of or in addition to intermediate casing. Liner strings are commonly run from the bottom of another type of casing to the open well area. However, liner strings are usually attached to the previous casing with hangers, instead of being cemented into place. This type of casing is thus less permanent than intermediate casing.

Production casing (e.g., well casing long string 11) is typically installed last and is the deepest section of casing in well 100. This is the casing that provides a conduit from the surface of well 100 to the storage formation in the earth. The size of the production casing depends on a number of considerations, including the lifting equipment to be used, the number of completions required, and the possibility of deepening well 100 at a later time.

In addition to strengthening the well hole, well casing also provides a conduit to allow biogases to be stored and to be extracted without intermingling with other fluids and formations 104 found underground.

Well 100 may undergo a process of finishing called completion so that it is ready to store biogas. Completion may comprise deciding on the characteristics of the portion of well 100 in the targeted formation. There are a number of types of completions known in the art. Exemplary completions include open hole completions, conventional perforated completions, sand exclusion completions, permanent completions, multiple zone completions, and drainhole completions. The use of any type of completion depends on the characteristics and location of the formation for storage of the biogas. Injection screen 15 serves as the completion in this embodiment of the invention, and may be any of the completions described below.

In one embodiment, well 100 is finished using open hole completions. Open hole completions are the most basic type and are typically used in formations that are unlikely to cave in. An open hole completion entails running the casing directly down into the formation, and leaving the end of the piping open without any other protective filter.

In another embodiment, well 100 is finished using perforated completions, which includes a production casing being run through the formation 104. The sides of this casing may be perforated, with holes along the sides facing the formation, which allows for the flow of biogas into and out of well 100 and into formations 104, while providing support and protection for the well hole.

In another embodiment, well 100 is finished using sand exclusion completions. Sand exclusion completions are designed for production in an area that contains a large amount of loose sand. These completions may be designed to allow for the flow of biogas into and out of well 100, and prevent sand from entering well 100. Sand inside the well hole may cause complications, including erosion of casing and other equipment. The most common method of keeping sand out of the well hole are screening or filtering systems.

This includes analyzing the sand experienced in the formation and installing a screen or filter to keep sand particles out. This filter may either be a type of screen hung inside the casing, or adding a layer of specially sized gravel outside the casing to filter out the sand.

In another embodiment, well 100 is finished using permanent completions. Permanent completions are those in which the completion, and wellhead, are assembled and installed only once.

In another embodiment, well 100 is finished using multiple zone completions. Multiple zone completion is the practice of completing a well such that biogas may be stored in one or more formations 104 simultaneously. For example, a well may be drilled that passes through a number of formations 104 on its way deeper underground, or alternately, it may be efficient in a horizontal well to add multiple completions to store biogas in the formation(s) 104 most effectively. Although it is common to separate multiple completions so that the different formations do not intermingle, the complexity of achieving complete separation is often a barrier. When it is necessary to separate different completions, hard rubber packing instruments such as high density Polyethylene (HDPE) collars are used in a standard manner to maintain separation.

In another embodiment, well 100 is finished using drainhole completions. Drainhole completions are a form of horizontal or slant drilling. This type of completion consists of drilling out horizontally into the formation from vertical well 100, essentially providing a "drain" for the biogas to run down into well 100.

Well 100 can include a wellhead 102, or multiple wellheads (not shown), which are apparatus mounted at the opening of the well 100 to regulate and monitor the input, storage and extraction of biogas within the well and underground formation 104. Wellhead 102 can include an input 1 to inject the biogas into well 100 and an output 2 to remove the biogas from well 100. Wellhead 102 may also serve as a place to monitor the contents of the biogas within well 100. Wellhead 102 may be flush with the ground or may protrude from the ground. Wellhead 102 should be of sufficient strength to store the biogas at any pressure, including pressures of about 25 psi or more; about 100 psi or more; about 500 psi or more; or about 1,000 psi or more. Pressure meter 4 can be used to measure the pressure in well 100. Biogas may be stored within the earth for about 1 day or longer; about 1 week or longer; or about 1 month or longer prior to use. The biogas may be removed from well 100 at any time in order to generate energy. Methods for generating energy from biogas are known in the art.

The volume and storage capacity of well 100 can be increased by hydraulic fracturing. Hydraulic fracturing is used to create cracks in subsurface geologic formations 104, providing for additional storage of biogas. The cracks may extend 250 feet or more from the drill hole. One technique to accomplish hydraulic fracturing is to pump high volumes of water into the drill hole at high pressure, e.g., up to 3,000 psi. In other embodiments, hydraulic fracturing can be accomplished with dynamite, dry ice or compressed air. Hydraulic fracturing is particularly beneficial when well 100 is a natural gas well. In one embodiment, the concentration of methane gas in well 100 is increased by hydraulic fracturing using biogas at a high pressure in well 100. The high pressure may be about 1,000 psi or more. Hydraulic fracturing will open seams within the earth that will allow for the release of natural gas, which will increase the concentration of methane in the stored biogas.

In one embodiment, the invention provides methods for stimulating natural gas production from a natural gas well by injecting biogas into the well. The biogas is preferably injected and/or stored under pressure as described herein. Hydraulic fracturing may optionally be used to further stimulate natural gas production. The pressurized biogas in the well may be sufficient by itself to stimulate the release of natural gas from formations surrounding the well.

Subsequent to removal from well 100, biogas may be cleaned to remove components other than methane. Cleaning can include removing carbon dioxide, liquids (e.g., condensates), solid particulate matter and other impurities (e.g., hydrogen sulfide) from the biogas to produce relatively pure methane gas. "Relatively pure" methane gas includes at least about 80% methane; at least about 90% methane; at least about 95% methane; or at least about 99% methane. Removal of carbon dioxide from gas mixtures is known in the art and described, for example, in U.S. Pat. Nos. 3,130,026, 3,453,835, 3,975,172, 4,252,548 and 5,642,630, the disclosures of which are incorporated by reference herein in their entirety.

Processes for separating carbon dioxide from other gases include refrigeration to cause solid carbon dioxide deposition, a molecular sieve to capture carbon dioxide, chemical absorption or a combination of such techniques. Scrubbing a gas mixture with a solvent for carbon dioxide has been incorporated in several separation processes. Methods for removing liquids from biogas are known in the art and include, for example, lamellar pack condensation separators and cyclone-type condensation separators. Dry filters may be used to remove solid impurities. Biogas cleaning can be performed prior to injecting biogas into well 100, after being stored and removed from well 100, and/or inside well 100.

Figure 2A:
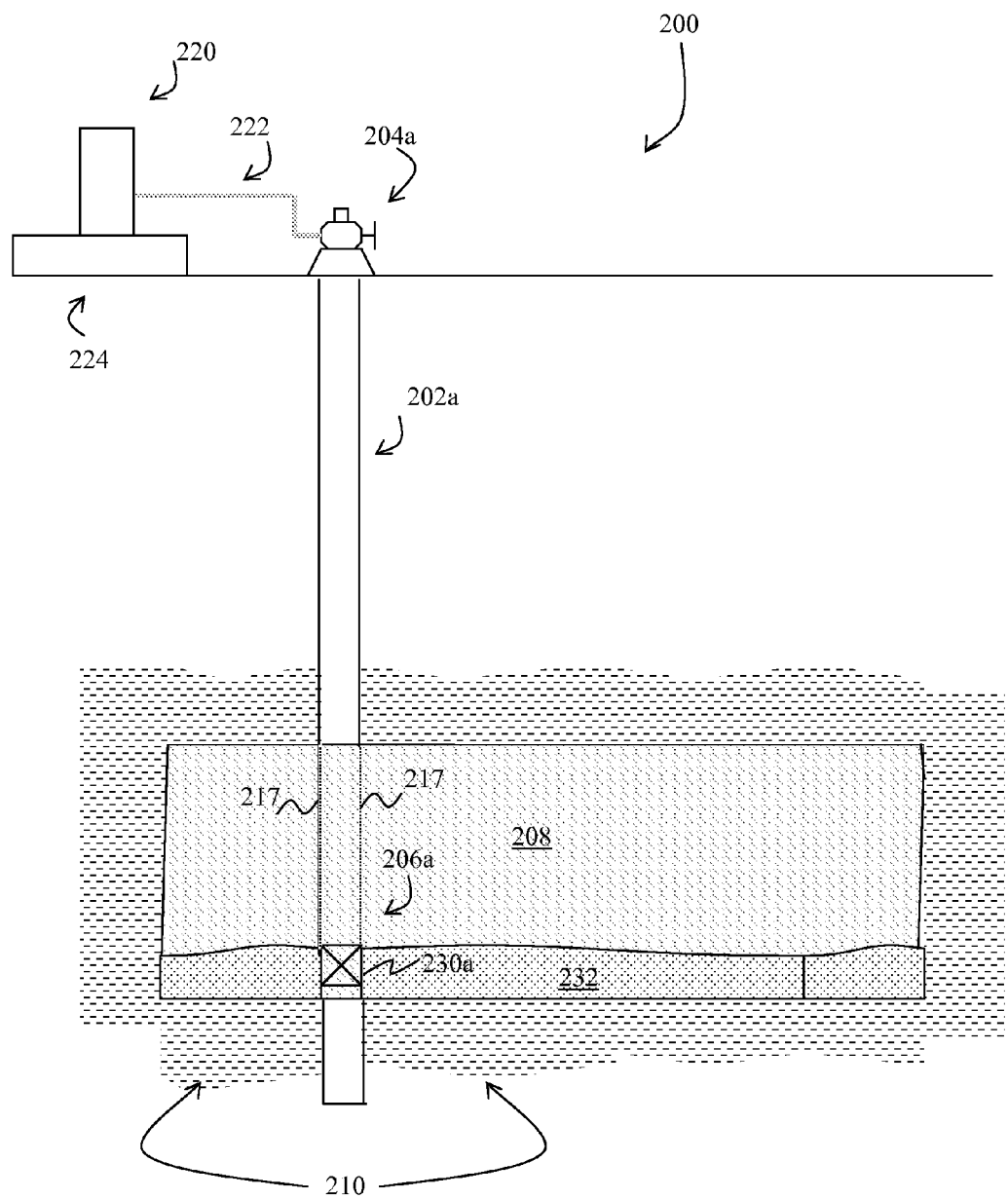
FIG. 2A depicts an exemplary system for storing biogas.

FIG. 2A, generally at 200, is a diagram illustrating an exemplary system for storing biogas in accordance with an embodiment of the present invention. System 200 includes well 202a, which can be of a type generally described in connection with FIG. 1. Biogas can be collected from waste disposal facility 224 and stored in well 202a. Waste disposal facility 224 can be, for example, a landfill site, a waste water treatment plant, or a farm digester. Exemplary methods for collecting biogas from waste disposal facility 224 are described in U.S. Pat. Nos. 4,026,355, 4,442,901, 4,469,176, 4,518,399, 4,670,148, and 5,206,067, the disclosures of which are incorporated herein by reference in their entirety. In some embodiments, biogas is collected at a waste disposal facility 224 using collection system 220. Transport system 222 (e.g., pipes and related infrastructure) transports biogas obtained from collection system 220 to well 202a.

Waste disposal facility 224 may include one or more deep and/or shallow wells (not shown) drilled or otherwise formed. The wells can be vertical and/or horizontal, and range from about 30 feet to about 250 feet in depth (or length). The well(s) may be lined with perforated casings so that biogas can enter the wells of waste disposal facility 224 through the perforations. To induce biogas to flow into the well, the well(s) may be maintained at or below local atmospheric pressure. The chemical reaction within waste disposal facility 224 creates a pressure greater than atmospheric so that the biogas migrates into the well(s). To augment this natural flow of biogas into the well(s), a pump may be used to reduce the pressure in the well(s) below ambient. A blower (not shown) may be used to facilitate movement of biogas from waste disposal facility 224 to transport system 222. In one embodiment of the invention, a blower can be used to increase the average pressure of biogas within transport system 222 to about 20 psig or more; about 40 psig or more; or about 60 psig or more. Wells or well systems such as disclosed in U.S.

patent application Ser. No. 11/098,426, filed Apr. 5, 2005, entitled Aerobic and Anaerobic Waste Management Systems And Methods for Landfills, may be used. U.S. patent application Ser. No. 11/098,426 is incorporated herein by reference in its entirety.

Well 202a has a wellhead 204a that receives biogas from transport system 222. Wellhead 204a can include an injection apparatus (not shown) for injecting biogas into well 202a. The injection apparatus (not shown) can be a (second) blower or compressor, which can also be used to increase the pressure of biogas inside well 202a and formation 208. For example, an Aerzen blower manufactured by National Process Equipment, Inc., Vancouver, Canada, can be used. The pressure of biogas inside well 202a and formation 208 can be raised, for example, from approximately 20 psig to approximately 50 psig, or more, so that well 202a can store additional biogas.

Figure 2B:
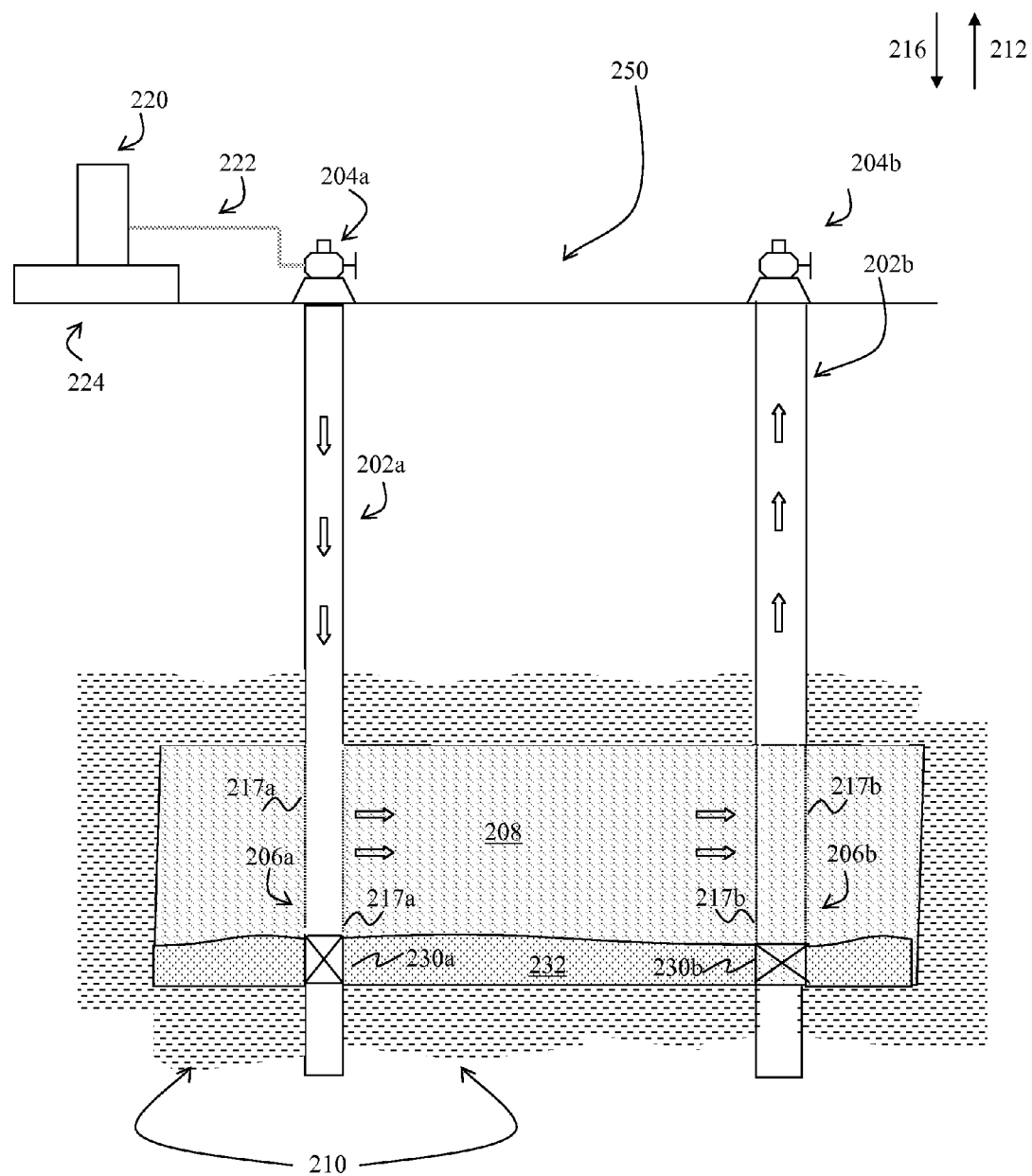
FIG. 2B depicts a second exemplary system for storing biogas.

Formation(s) 208 may be surrounded, for example, by sand 232 and shale 210. Formation(s) 208 can be a cavern capable of storing biogas. In addition, formation(s) 208 may include, for example, the Tully, Onondaga, Oriskany, Salt Zone, Medina, and Lockport formations, each of which are largely sandstone, and shales. Formation(s) 208 are of sufficient porosity such that biogas is generally able to pass through formation(s) 208, as indicated in FIGS. 2A and 2B by the arrows pointing within formation 208 in the direction of well 202a to 202b. A standard seal 230a can utilized to seal formation 208. In this case, perforations 217 may be provided to facilitate migration of the biogas from well 202a into formation 208. After being stored inside well 202a and formation 208 for a desired length of time, biogas may be withdrawn through wellhead 204a.

FIG. 2B, generally at 250, is a diagram illustrating another exemplary system for storing biogas in accordance with various embodiments of the present invention. System 250 includes injection well 202a and production well 202b, which can be of a type generally described in connection with FIG. 1. Wells 202a and 202b have respective lower portions 206a and 206b that are located within an formation 208.

In some embodiments, biogas is collected at a waste disposal facility 224 using collection system 220, in a manner described in connection with FIG. 2A. An injection apparatus such as a blower or compressor that may be a part of or associated with wellhead 204a, can also be used to increase the pressure of biogas inside wells 202a, 202b and formation 208. The pressure of biogas inside wells 202a, 202b and formation 208 can range, for example, from approximately 20 psig to approximately 50 psig, or more, so that well 202a can store additional biogas. Once inside well 202a, biogas moves in the direction of arrow 216 toward the lower portion 206a and formation 208.

Standard seals 230a, 230b can be respectively provided in wells 202a, 202b, and utilized to seal formation 208. In this case, perforations 217a may be provided to facilitate migration of the biogas from well 202a into formation 208. Similarly, perforations 217b may be provided to facilitate migration of the biogas from formation 208 into well 202b.

After being stored inside wells 202a, 208b and formation 208 for a desired length of time, biogas may be withdrawn, in the direction of arrow 212, through wellhead 204b. This can be performed by a collection system (not shown), which can be located at or near wellhead 204b. Therefore, with system 250, biogas can be simultaneously injected into well 202a and withdrawn from well 202b. In addition, with system 250, biogas can be injected into well 202a at a first location, and withdrawn from well 202b at a second location to facilitate processing of biogas withdrawn from well 202b at a facility that is located near well 202b.

Systems 200 and 250 can further include a data collection system (not shown) for collecting and analyzing data that is related to the operation of system 250. Relevant data may include: volumes of biogas injected into well 202a, volumes of biogas withdrawn from well 202b, biogas composition in wells 202a, 202b and/or formation 208, pressure inside wells 202a, 202b and formation 208, and/or atmospheric conditions (e.g., temperature and/or relative humidity) within wells 202a, 202b and formation 208. Such data may be used in connection with performance testing, regulatory reporting, and/or statistical tracking.

Other embodiments, extensions, and modifications of the ideas presented above are comprehended and within the reach of one skilled in the art upon reviewing the present disclosure. Accordingly, the scope of the present invention in its various aspects should not be limited by the examples and embodiments presented above. The individual aspects of the present invention, and the entirety of the invention should be regarded so as to allow for modifications and future developments within the scope of the present disclosure. The present invention is limited only by the claims that follow.

What is claimed is:

1. A system for storing biogas, the system comprising:
a well extending below a potable water aquifer;
a well casing extending along length of the well, wherein the well casing and the well form a conduit, wherein the conduit is capable of storing biogas;
a transport system for transporting biogas from a waste disposal facility to the well;
a wellhead configured to regulate and monitor the contents of the biogas within the well, wherein the wellhead comprises an apparatus configured to inject biogas into the well and manipulate the pressure of the biogas inside of the well;
a system for removing components other than methane from the biogas, wherein the removal occurs while the biogas is inside of the well; and
a collection apparatus coupled with the well for withdrawing biogas from the conduit formed by the well casing and the well, wherein, the biogas comprises more than 40% methane and less than 75% carbon dioxide.

2. The system of claim 1, wherein the waste disposal facility comprises a landfill.

3. The system of claim 2, wherein the biogas comprises landfill gas.

4. The system of claim 1, further comprising an underground formation communicating with the well and storing biogas.

5. A system for storing biogas, the system comprising:
a first well extending below a potable water aquifer;
a transport system for transporting biogas from a waste disposal facility to the first well;
a wellhead configured to regulate and monitor the contents of the biogas within the well, wherein the wellhead comprises an apparatus configured to inject biogas into the well and manipulate the pressure of the biogas inside of the well;
a second well extending below a potable water aquifer;
an underground formation communicating with the first well and the second well and storing biogas;
a collection apparatus coupled with the second well for withdrawing biogas from the second well;
a system for removing components other than methane from the injected biogas from at least one of the first well and the second well, wherein the removal occurs while the biogas is inside of the well; and a compressor for pressurizing the biogas contained within the first well, the second well, and the underground formation, wherein the biogas comprises more than 40% methane and less than 75% carbon dioxide.

6. The system of claim 5, wherein the waste disposal facility comprises a landfill.

7. The system of claim 6, wherein the biogas comprises landfill gas.

8. A method for storing biogas, comprising:
collecting biogas from a landfill;
transporting the biogas to a first well, extending below a potable water aquifer, wherein the first well comprises a well casing extending along length of the well, wherein the well casing and the first well form a conduit;
injecting the biogas into the conduit formed by the well casing and the first well by a wellhead associated with the first well;
pressurizing the first well to store the biogas;
adjusting the pressure of the stored biogas in the first well with the wellhead; and
a system for removing components other than methane from the injected biogas, wherein the removal occurs while the biogas is inside of the first well.

9. The method of claim 8, further comprising moving the biogas from a lower portion of the first well into an underground formation communicating with the first well and storing biogas.

10. The method of claim 8, further comprising withdrawing the biogas from a second well.

11. The system of claim 1, wherein the wellhead is configured to extract biogas from the well.

12. The system of claim 1, wherein the apparatus is at least one of a blower or compressor.

13. The system of claim 4, wherein the well comprises a casing configured to prevent foreign fluids and substances from entering the formation storing the biogas.

14. The system of claim 13, wherein the interior of the casing comprises a partial polymer coating.

15. The system of claim 13, wherein the casing is at least one of conductor casing, surface casing, intermediate casing, liner strings, and production casing.

16. The method of claim 9, further comprising creating cracks in the underground formation by use of hydraulic fracturing.

17. The method of claim 16, wherein the hydraulic fracturing includes pumping at least one of water, biogas, or compressed air into the underground formation prior to the storage of the biogas.

18. The method of claim 17, wherein the at least one of water, biogas, or compressed air is pumped at a pressure above 1,000 psi and below 3,000 psi.

* * * * *